United States Patent
Dekel et al.

(10) Patent No.: US 12,147,620 B2
(45) Date of Patent: Nov. 19, 2024

(54) CONTEXTUAL DATA LINK MODE STYLUS COMMUNICATIONS

(71) Applicant: Microsoft Technology Licensing, LLC, Redmond, WA (US)

(72) Inventors: Shoham Dekel, Tel Aviv (IL); Assaf Bar-Ness, Ness Ziona (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/067,078

(22) Filed: Dec. 16, 2022

(65) Prior Publication Data

US 2024/0201803 A1 Jun. 20, 2024

(51) Int. Cl.
G06F 3/038 (2013.01)
G06F 3/0354 (2013.01)
G06F 3/041 (2006.01)
G06F 3/044 (2006.01)
G06F 3/0482 (2013.01)

(52) U.S. Cl.
CPC .......... *G06F 3/038* (2013.01); *G06F 3/03545* (2013.01); *G06F 3/04162* (2019.05); *G06F 3/04166* (2019.05); *G06F 3/0442* (2019.05); *G06F 3/0482* (2013.01); *G06F 2203/04108* (2013.01); *G06F 2203/04807* (2013.01)

(58) Field of Classification Search
CPC .. G06F 3/038; G06F 3/03545; G06F 3/04162; G06F 3/04166; G06F 3/0442; G06F 3/0482; G06F 2203/04108; G06F 2203/04807
See application file for complete search history.

(56) References Cited

U.S. PATENT DOCUMENTS

| | | | |
|---|---|---|---|
| 8,924,585 B2 | 12/2014 | Dellinger et al. | |
| 9,891,722 B2 | 2/2018 | Hicks et al. | |
| 10,185,415 B2 | 1/2019 | Dekel | |
| 10,439,753 B2 | 10/2019 | Imanilov | |
| 10,481,705 B2 | 11/2019 | Qiao et al. | |
| 10,719,148 B2 | 7/2020 | Gilbert et al. | |
| 10,782,799 B2 | 9/2020 | Nicholson et al. | |
| 11,455,054 B2 | 9/2022 | Perez et al. | |
| 2018/0143703 A1* | 5/2018 | Fleck | G06F 3/0383 |
| 2018/0329524 A1 | 11/2018 | Yamamoto | |
| 2020/0019255 A1* | 1/2020 | Gilbert | G06F 3/03545 |
| 2021/0303087 A1 | 9/2021 | Vanka | |

OTHER PUBLICATIONS

International Search Report and Written Opinion received for PCT Application No. PCT/US23/035654, mailed on Jan. 23, 2024, 13 pages.

* cited by examiner

*Primary Examiner* — Jonathan A Boyd
(74) *Attorney, Agent, or Firm* — Holzer Patel Drennan

(57) ABSTRACT

A computing device detects an indication of a data-linkable context for the electronic stylus and transitions communication between the digitizer of the computing device and the electronic stylus from a user interface mode to a data link mode, based at least in part on the detecting. The computing device communicates between the electronic stylus and the digitizer in the data link mode via the multiple electrostatic antennas of the electronic stylus, based at least in part on the transitioning.

22 Claims, 5 Drawing Sheets

CONTEXTUAL DATA LINK MODE STYLUS COMMUNICATIONS

BACKGROUND

Some electronic stylus devices support multiple modes of communication with a computing device. In one mode, called "inking mode," the electronic stylus communicates with a digitizer of the computing device to effecting inking operations, such as drawing/writing digital ink in a digitized display, erasing digital ink from the display, selecting controls presented in the display, etc. Other modes, such as "selection mode," may also be supported by an electronic stylus device and a digitizer. Such modes (including inking mode and selection mode) interact with the user interface of the computing device and are therefore referred to as "user interface modes." In another mode, called "uplink/downlink" mode or "data link" mode, the electronic stylus and the digitizer communicate non-inking information, such as pen status, telemetry, firmware updates, etc.

SUMMARY

In some aspects, the techniques described herein relate to a method of managing electrostatic communications between a digitizer of a computing device and an electronic stylus including multiple electrostatic antennas, the method including: detecting an indication of a data-linkable context for the electronic stylus; transitioning communication between the digitizer of the computing device and the electronic stylus from a user interface mode to a data link mode, based at least in part on the detecting; and communicating between the electronic stylus and the digitizer in the data link mode via the multiple electrostatic antennas of the electronic stylus, based at least in part on the transitioning.

In some aspects, the techniques described herein relate to a system for managing electrostatic communications between a digitizer of a computing device and an electronic stylus including multiple electrostatic antennas, the system including: one or more hardware processors; a stylus context detector executable by the one or more hardware processors and configured to detect an indication of a data-linkable context for the electronic stylus; a mode modifier executable by the one or more hardware processors and configured to transition communication between the digitizer of the computing device and the electronic stylus from a user interface mode to a data link mode, based at least in part on the detecting; and an electrostatic communication interface executable by the one or more hardware processors and configured to communicate between the electronic stylus and the digitizer in the data link mode via the multiple electrostatic antennas of the electronic stylus, based at least in part on the transitioning the communication between the digitizer of the computing device and the electronic stylus from the user interface mode to the data link mode.

In some aspects, the techniques described herein relate to one or more tangible processor-readable storage media embodied with instructions for executing on one or more processors and circuits of a computing device a process for managing electrostatic communications between a digitizer of a computing device and an electronic stylus including multiple electrostatic antennas, the process including: detecting an indication of a data-linkable context for the electronic stylus using the multiple electrostatic antennas of the electronic stylus; transitioning communication between the digitizer of the computing device and the electronic stylus from a user interface mode to a data link mode, based at least in part on the detecting; and communicating between the electronic stylus and the digitizer in the data link mode via at least one of the multiple electrostatic antennas of the electronic stylus, based at least in part on the transitioning.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

DETAILED DESCRIPTIONS

Figure 1:
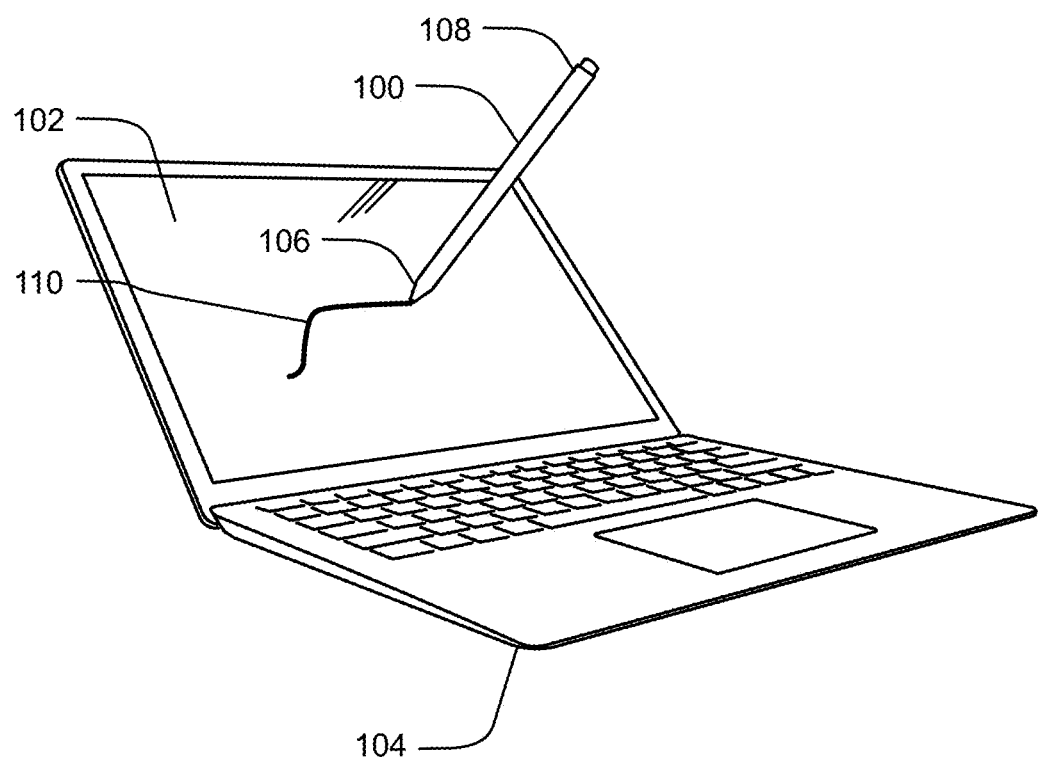
FIG. 1 illustrates an example electronic stylus communicating with a digitizer in a user interface mode.

Communications in the user interface mode and the data link mode tend to happen in distinct periods in many implementations. For example, updating the firmware of the electronic stylus while a user is using the stylus to write on a tablet computer with a digitizer would reduce user interface mode performance by taking up valuable communication bandwidth from the inking communications. Furthermore, a firmware update would likely interrupt the user's inking workflow while the stylus restarts.

Accordingly, the described technology supports distinct contexts for data communication between an electronic stylus and a computing device (e.g., a computing device with a digitizer through which the communication is performed). In one implementation, these contexts include a data-linkable context triggered by the user, indicating that the stylus can safely be transitioned from user interface mode to data link mode. As such, rather than attempting to identify appropriate periods for data link mode by evaluating clues that suggest the user is not inking or not planning to ink (e.g., detecting that the stylus is not moving using accelerometers, detecting that the user is not communicating with the digitizer), the described technology allows a user to indicate explicitly that the electronic stylus is in a data-linkable context where it is available for data link mode. A technical effect of this approach includes more accurately determining a context when the user is not planning to use the stylus in an inking mode or another user interface mode so that data link mode can be executed safely (e.g., without degrading or interrupting stylus performance in a user interface mode). For example, by performing certain convenient steps, the user can indicate that the stylus may switch from a user interface mode to a data link mode without interrupting the user's workflow and, optionally, participate in data link mode communications with multiple electrostatic antennas in the stylus (e.g., to obtain faster data transfer speeds).

Furthermore, some electronic stylus devices have multiple antennas for communicating with a digitizer. The user-indicated data-linkable context can be interpreted as a context in which data link mode is temporarily the dominant or only communication mode between that stylus and the digitizer. As such, having detected the user-indicated data-linkable context, the stylus can therefore dedicate more than one of its antennas to the data link mode communication, thereby increasing the data throughput in the data link mode as compared to communication via a single stylus antenna. A technical effect of this approach includes increasing data link mode communication speeds over a single antenna approach.

The data-linkable context can be detected in a variety of ways, such as by the user indicating through a user interface of the computing device that he or she wishes to trigger the data-linkable context. In one implementation, in response to the triggering of the data-linkable contest, the computing device enter a data link mode and can instruct the electronic stylus to enter a data link mode. In another implementation, the user can place the electronic stylus in different configurations so as to explicitly indicate a data-linkable context (e.g., placing the stylus in a charging position against an edge of the computing device, placing the stylus in or on a separate charging peripheral, laying the stylus flat on the digitized display such that antennas at both ends of the stylus are detecting in very close proximity to the digitizer). In this implementation, the stylus and/or the computing device may detect the data-linkable context and transition automatically to a data link mode. Other triggering mechanisms may be employed. A technical effect of this approach includes flexible choices for indicating that the user is not planning to use the stylus in a user interface mode, at least for a while, thereby increasing the speed, completeness, and convenience of data link mode communications (e.g., the stylus can communicate via multiple antennas; the user is less likely to interrupt the data link mode, which can require the data link communications to start over in some cases).

FIG. 1 illustrates an example electronic stylus 100 communicating with a digitizer in a user interface mode. The digitizer (not shown) is positioned in or near a display 102 of a computing device 104. The digitizer includes an array of electrostatic antennas capable of communicating electrostatic signals with multiple antennas positioned in the electronic stylus 100. In one implementation, the electronic stylus 100 includes an electrostatic antenna at an inking tip end 106 and another electrostatic antenna at an eraser end 108, although the specific placement of electrostatic antennas can vary in different implementations. In addition, the electronic stylus 100 can include more than two electrostatic antennas. The electronic stylus 100 is shown in FIG. 1 in a user interface mode (e.g., an inking mode rendering a line 110 of digital ink in the display 102).

In contrast, the digitizer and the electronic stylus 100 can also communicate electrostatic signals in a data link mode without necessarily resulting in changes to the user interface, such as updating the firmware of the electronic stylus 100 via an uplink communication from the digitizer to the electronic stylus 100 or downloading telemetry, pen status, etc. in a downlink communication from the electronic stylus 100 to the digitizer. Bidirectional communications between the digitizer and the electronic stylus 100 can also be executed in the data link mode. The different modes of the electronic stylus 100 and the computing device 104 are implementable via circuitry and/or software executed by one or more hardware processors.

Data link mode can involve a significant amount of data communicated between the digitizer and the electronic stylus 100, such as for a firmware update. However, executing a firmware update, for example, while a user is employing the electronic stylus 100 to manipulate the user interface, can slow down the responsiveness of the user's experience with the electronic stylus 100 and can potentially interrupt the user's experience when the electronic stylus 100 restarts after the firmware update is loaded. Accordingly, the described technology detects an indication of a data-linkable context for the electronic stylus 100, wherein the data-linkable context indicates that the digitizer and the electronic stylus 100 can enter a data link mode without disrupting the user's work with the electronic stylus 100 through the user interface of the computing device 104.

In one implementation, the user explicitly triggers a data-linkable context through the user interface of the computing device 104, such as by changing a setting in a stylus management utility. For example, the user can enter a settings or system preferences feature in the computing device 104 to indicate that the electronic stylus 100 is available for a data uplink/downlink. Typically, this indication implies that the user does not plan to use the electronic stylus 100 in a user interface mode for a while, so it is safe to trigger an otherwise disruptive data link operation. Another example indication includes the user simply laying the electronic stylus 100 down on the surface of the display 102 for a period of time. The computing device 104 can then detect that both electrostatic antennas are stationary and in close proximity to the digitizer and interpret this as an indication of the data-linkable context. Other indications are possible, including magnetically attaching the electronic stylus 100 to the metal side of the computing device 104, inserting the electronic stylus 100 into a charging peripheral, etc. In some implementations, a detection that the electronic stylus 100 is stationary or at least stationary in relation to the digitizer for a pre-designated period of time may also constitute an explicit indication that the electronic stylus 100 is in a data-linkable context.

The user's indication may further trigger the computing device 104 to present instructions to the user to facilitate communications in the data link mode. For example, the computing device 104 can instruct the user to place both ends of the electronic stylus 100 within a displayed bounding box or at specific locations displayed on the display 102 of the computing device 104. In this way, antennas at both ends of the electronic stylus 100 are in close proximity to the digitizer such that the strengths of the electrostatic signals communicated between the antennas and the digitizer are maximized. This approach also enhances the data communication speed with two strong data channels as compared to a single antenna scenario. Furthermore, positioning the antennas in close proximity to the digitizer precludes the use of the electronic stylus 100 in a user interface mode because the electronic stylus 100 remains very close to the digitizer rather than being employed in a less proximate manner by the user for writing, erasing, selecting, etc.

Figure 2:
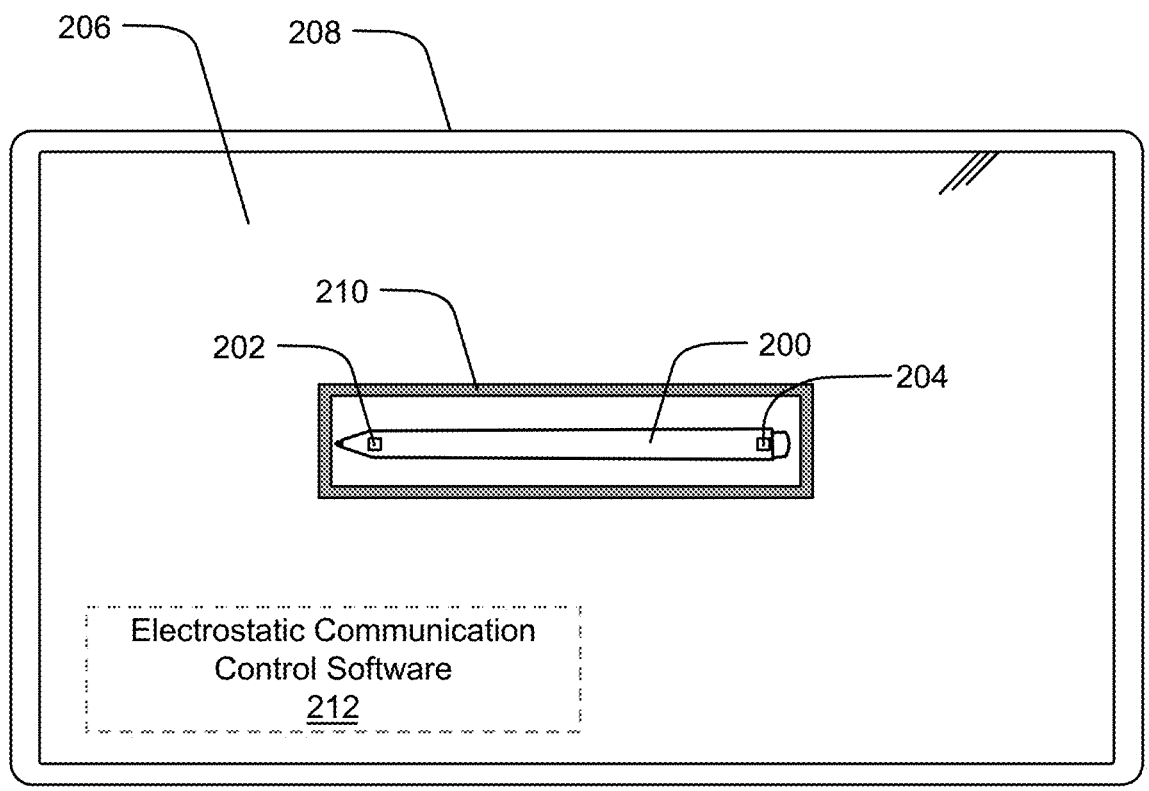
FIG. 2 illustrates an example electronic stylus communicating with a digitizer in a data link mode via multiple stylus antennas.

FIG. 2 illustrates an example electronic stylus 200 communicating with a digitizer in a data link mode via multiple stylus antennas. In the illustrated implementation, the electronic stylus 200 includes an electrostatic antenna 202 in the inking tip end of the electronic stylus 200 and an electrostatic antenna 204 in the eraser end of the electronic stylus 200. The electronic stylus 200 is shown resting on a display 206 (e.g., a touchscreen display) of a tablet computing device 208, which displays a rectangular bounding box 210 into which the user is to place the electronic stylus 200 to indicate that the electronic stylus 200 is in a data-linkable context. Other user interface guidance options may be employed.

In some implementations, the user can trigger the display of the rectangular bounding box 210 via a user interface action, such as a gesture, a menu selection, a verbal command, a keyboard shortcut, etc. In these implementations, the indication of the data-linkable context is triggered after the user interface action and the placement of the electronic stylus 200 within the rectangular bounding box 210. In other implementations, the user can place the electronic stylus 200 on the display 206 with or without a rectangular bounding box 210 (e.g., for a predefined period of time) to indicate the data-linkable context without additional user interface actions. For example, if the electrostatic antenna 202 and the electrostatic antenna 204 are detected in close proximity (e.g., a few millimeters) to the digitizer under the cover glass of the display 206 for a predefined period of time, this can be reasonably interpreted as a period when the user is intentionally indicating that he or she does not plan to use the electronic stylus 200 for inking, selection, or other user interface actions for a nontrivial period of time. Other placements of the electronic stylus 200 are also contemplated to indicate a data-linkable context, such as placing the electronic stylus 200 in or on an external charging surface or peripheral, with or without specific user interface-triggered instructions.

Electrostatic communication control software 212 can manage the user interface for instructions to enter the data-linkable context and/or to monitor the placement of the electronic stylus 200 to detect the predefined stylus placement designated to indicate the data-linkable context. For example, if the electrostatic communication control software 212 detects that both the electrostatic antenna 202 and the electrostatic antenna 204 are communicating with a substantially equal strong electrostatic signal with the digitizer (e.g., are both in close proximity), the electrostatic communication control software 212 can indicate the data-linkable context. Alternatively, the electrostatic communication control software 212 may also determine whether the electrostatic antenna 202 and the electrostatic antenna 204 are within the rectangular bounding box 210 or in some other predefined placement to indicate the data-linkable context (e.g., the user's intention to refrain from using the electronic stylus 200 in user interface mode for a nontrivial period of time), with or without a prior user interface-triggered instruction by the user.

In yet other implementations, the electrostatic communication control software 212 need not evaluate signals from more than one electrostatic antenna of the electronic stylus 200 to detect an indication of the data-linkable context. For example, the detection of one electrostatic antenna within the rectangular bounding box 210 may be sufficient to detect an indication of the data-linkable context. Alternatively, user interface-triggered instructions followed by the detection of a strong electrostatic signal from at least one electrostatic antenna of a stationary electronic stylus by the digitizer may be sufficient to detect an indication of a data-linkable context. Accordingly, one or more electrostatic antennas of the electronic stylus 200 may be used in an operation of detecting an indication of the data-linkable context.

After the data-linkable context has been detected, the electrostatic communication control software 212 can commence communications in a data link mode, ostensibly with safety in that the user is not expected to begin using the electronic stylus 200 in a user interface mode in the near future. As such, the electrostatic communication control software 212 can switch to a data link mode that employs high-speed data communication between the electronic stylus 200 and the digitizer. A technical benefit of this approach includes reducing the likelihood of interrupting data link communications (including an update), which can require the data link communications to be restarted or interrupt a user's use of the electronic stylus 200 by rebooting to complete the installation of newly uploaded software to electronic stylus 200.

In some implementations, the data link mode can employ a burst mode of data uplink and/or data downlink packets or windows through one or more electrostatic antennas of the electronic stylus 200 to the substantial exclusion of user interface mode packets or windows in order to enhance the data communication speed between the electronic stylus 200 and the digitizer. In other implementations, high-speed data communication may be achieved by simply using multiple electrostatic antennas of the electronic stylus 200 because such implementations can interpret data-linkable context to correspond to multiple electrostatic antennas of the electronic stylus 200 being in close proximity to the digitizer. As such, multiple communication channels (e.g., one from each antenna) can result in a faster communication speed as compared to a single antenna.

Figure 3:
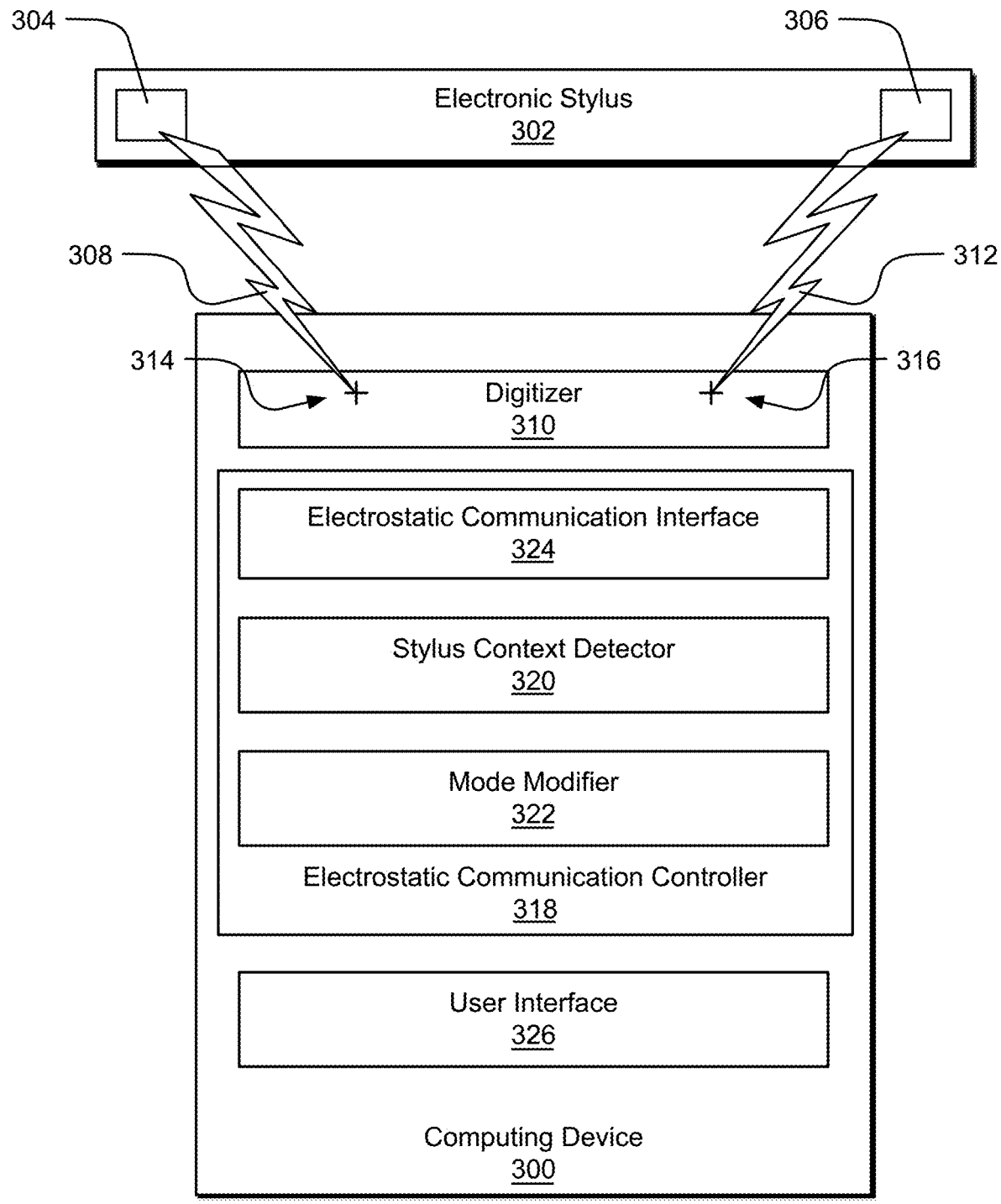
FIG. 3 illustrates an example computing device configured to perform contextual data link mode stylus communications.

FIG. 3 illustrates an example computing device 300 configured to perform contextual data link mode stylus communications. An electronic stylus 302 includes an electrostatic antenna 304 and an electrostatic antenna 306, although some implementations may employ an electronic stylus with a single electrostatic antenna or with more than two electrostatic antennas.

The lightning bolt symbol 308 indicates electrostatic communication between the electrostatic antenna 304 and a digitizer 310 of the computing device 300, and the lightning bolt symbol 312 indicates electrostatic communication between the electrostatic antenna 306 and the digitizer 310 of the computing device 300. In some implementations, the digitizer 310 is a component of a touchscreen display of the computing device 300, wherein the digitizer 310 includes an array of electrostatic antennas that allows an electrostatic communication controller 318 to determine the locations of the electrostatic antenna 304 and the electrostatic antenna 306 relative to X-Y coordinates 314 and 316 relative to the touchscreen display (e.g., via triangulation or center of mass analysis of electrostatic signal strengths) as part of detecting the indication of a data-linkable context. In some implementations, only the X-Y coordinates of one electrostatic antenna may be used, and in other implementations, the X-Y coordinates of more than two electrostatic antennas may be used to indicate a data-linkable context.

In yet other implementations, the indication (e.g., including a user-actuated indication) of a data-linkable context need not involve a digitizer. For example, placement of the electronic stylus 302 in a charging peripheral or against a magnetic surface of a computing device, which may include a charging interface, can indicate a data-linkable context. In such implementations, the data-linkable context can be detected based on the detection of a charging current at a charging interface of a computing device by a signal received from the electronic stylus 302 indicating that it is being charged, by capacitive or other proximity detectors, etc. Accelerometers may also be used to detect that the electronic stylus 302 is stationary, which can be considered as a factor indicating a data-linkable context. Other factors may also be evaluated, such as whether the computing device 300 can determine that more than one electrostatic antenna of the electronic stylus 302 can communicate with the computing device 300 (e.g., the antennas are operational or are in close enough proximity to be sufficiently operational), that one or more electrostatic antennas of the electronic stylus 302 are in the proximity of the digitizer and/or within a bounding box presented on the display of the computing device 300, etc. A technical benefit to this approach is to confirm that the one or more antennas are sufficiently operational (e.g., close enough to the digitizer to communicate effectively) before relying on them for communications. If the one or more antennas are not determined to be operational, the user may be alerted to a problem, or the ostensibly higher-speed communications may be unavailable.

In general, one or more factors may be evaluated against one or more predefined proximity conditions, predefined location conditions, and/or predefined contextual conditions. As previously discussed, a predefined proximity condition may require that both antennas are detected in close proximity to the digitizer. For example, a predefined proximity condition may require that both antennas are detected within a bounding box presented on a display of the computing device 300 and are able to communicate with the digitizer via sufficiently strong signals. As such, satisfying a predefined proximity condition can be recognized as an explicit indication of a data-linkable context. Proximity is also a factor in establishing a high-speed communication channel between the computing device 300 and the electronics stylus 302.

While proximity may be used as at least part of an explicit indication of a data-linkable context, other contextual factors may also be considered. Generally, predefined proximity conditions, predefined location conditions, and/or predefined contextual conditions may be referred to as predefined contextual conditions. Various conditions may also be combined to indicate a data-linkable context.

In an example of a predefined location condition, the electronic stylus 302 may be required to be detected in a charging peripheral or magnetically attached to a surface of the computing device. In an example using another predefined contextual condition, the electronic stylus 302 must also be detected as charging and/or as stationary based on accelerometer readings, although other contextual conditions may be used. Predefined contextual conditions may depend on one or more factors that are determinable between the electronic stylus 302 and a computing device. In other implementations (e.g., implementations that do not rely on a digitizer to detect an indication of a data-linkable context), other factors are evaluated against a predefined context condition (e.g., the stylus is charging, which is interpreted as at least one factor potentially indicating of a data-linkable context).

In the computing device 300 illustrated in FIG. 3, an electrostatic communication controller 318 manages electrostatic communications between a digitizer of a computing device and an electronic stylus, including detection of an indication of data-linkable context, transitioning between user interface mode and data link mode, and communicating in data link mode between the electronic stylus 302 and the computing device 300. The electrostatic communication controller 318 can be implemented in software and/or circuitry.

In the illustrated implementation, the electrostatic communication controller 318 includes a stylus context detector 320 that is configured to detect an indication of the data-linkable context via the digitizer 310. In other implementations, the stylus context detector 320 detects an indication of the data-linkable context via other input/output and/or operational circuitry of the computing device 300 (e.g., charging circuitry, proximity detection circuitry, signals received from a charging peripheral, network-communicated signals). In some implementations, a user interface 326 of the computing device 300 is used as part of the detection protocol, such as the user instructing the computing device 300 to start detection using a user interface command, although other implementations do not use the user interface 326. The stylus context detector 320 detects the data-linkable context by evaluating detected factors against a predefined proximity condition, against a predefined location condition, and/or, more generally, against a predefined context condition. If the factors satisfy the predefined condition, the indication of a data-linkable context is deemed detected. Note: A technical benefit of including a user interface instruction as part of the detection method tends to make the indication of the data-linkable context very explicit (e.g., involving user instructions), although less explicit indications may also be beneficial.

If the data-linkable context is detected, a mode modifier 322 transitions the communications between the electronic stylus 302 and the computing device 300 from user interface mode to data link mode. This transition may involve altering the communication protocol to supported data link mode, using more than one electrostatic antenna in each of the electronic stylus 302 and the computing device 300, changing the signaling protocol for data link mode, and/or other communication changes.

After the transition to data link mode, an electrostatic communication interface 324 executes communications between the electronic stylus 302 and the digitizer 310 in the data link mode via the one or more electrostatic antennas of the electronic stylus 302. In some implementations, communicating using multiple electrostatic antennas of the electronic stylus 302 is used to increase the speed of the communications. Example data link mode communications may include without limitation firmware updates to the electronic stylus 302, telemetry, and/or pin status downlinks from the electronic stylus 302.

Figure 4:
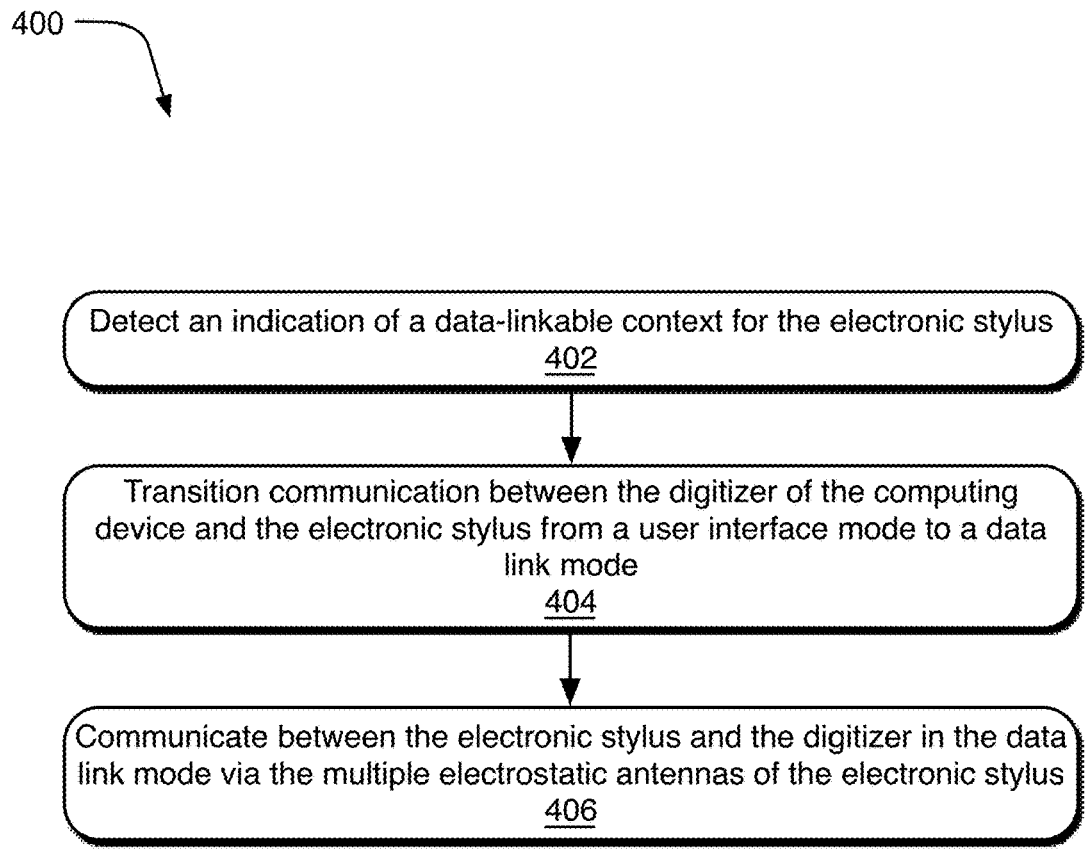
FIG. 4 illustrates example operations for managing electrostatic communications between a digitizer of a computing device and an electronic stylus including multiple electrostatic antennas.

FIG. 4 illustrates example operations 400 for managing electrostatic communications between a digitizer of a computing device and an electronic stylus including multiple electrostatic antennas. A detecting operation 402 detects an indication of a data-linkable context for the electronic stylus. A mode modifying operation 404 transitions communication between the digitizer of the computing device and the electronic stylus from a user interface mode to a data link mode, based at least in part on the detecting. A communication operation 406 communicates between the electronic stylus and the digitizer in the data link mode via the multiple electrostatic antennas of the electronic stylus, based at least in part on the transitioning. In alternative implementations, the detection may be accomplished using only a single electrostatic antenna or multiple electrostatic antennas in the electronic stylus. Further, in alternative implementations, the communication may be accomplished using only a single electrostatic antenna or multiple electrostatic antennas in the electronic stylus.

Figure 5:
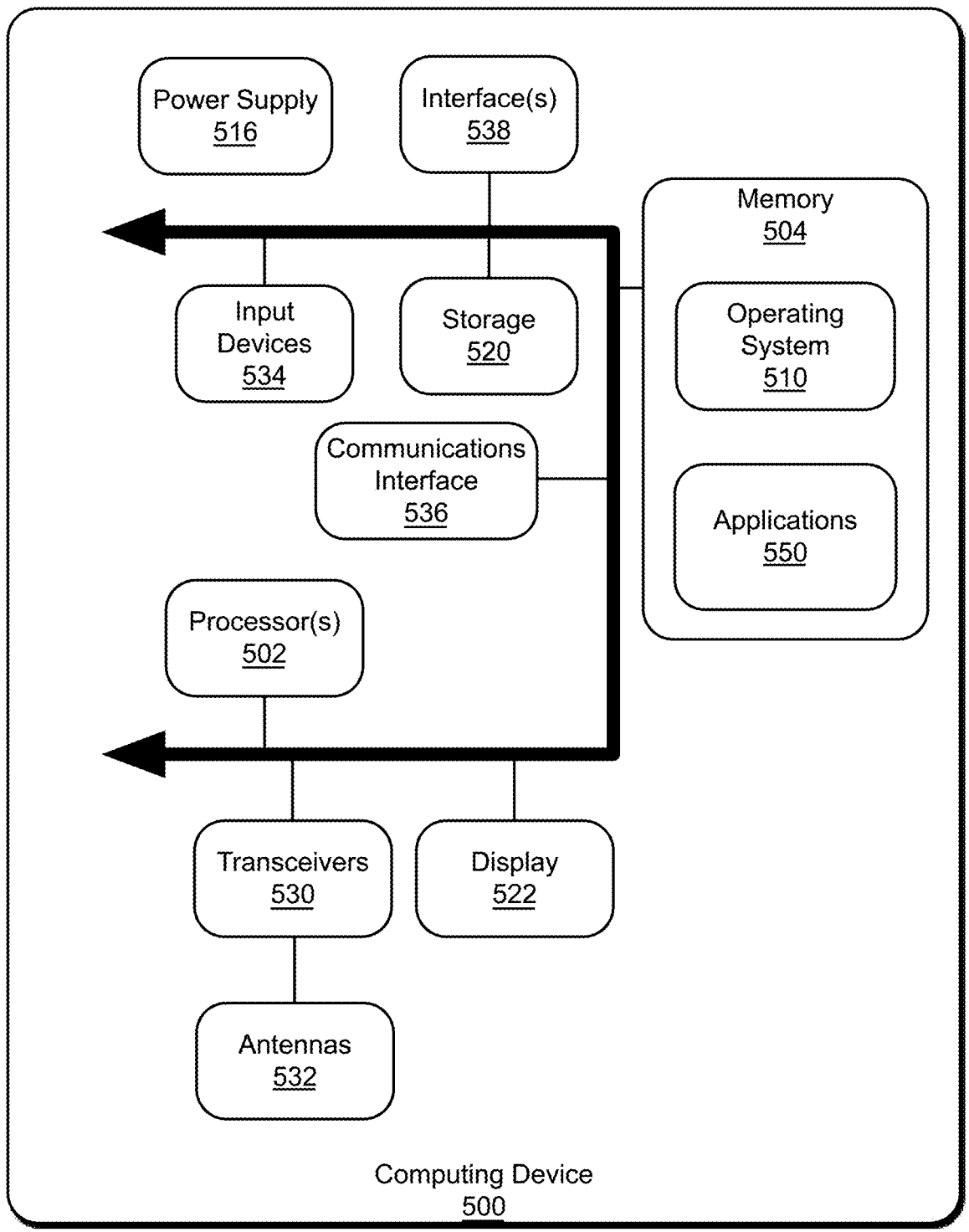
FIG. 5 illustrates an example computing device for implementing the features and operations of the described technology.

FIG. 5 illustrates an example computing device 500 for implementing the features and operations of the described technology. The computing device 500 may embody a remote-control device or a physically controlled device and is an example network-connected and/or network-capable device and may be a client device, such as a laptop, mobile device, desktop, tablet; a server/cloud device; an internetof-things device; an electronic accessory; or another electronic device. The computing device 500 includes one or more processor(s) 502 and a memory 504. The memory 504 generally includes both volatile memory (e.g., RAM) and nonvolatile memory (e.g., flash memory). An operating system 510 resides in the memory 504 and is executed by the processor(s) 502.

In an example computing device 500, as shown in FIG. 5, one or more modules or segments, such as applications 550; elements of an electrostatic communication interface, a stylus context detector, a mode modifier, and a user interface; and other modules are loaded into the operating system 510 on the memory 504 and/or storage 520 and executed by processor(s) 502. The storage 520 may include one or more tangible storage media devices and may store predefined proximity conditions, predefined location conditions, predefined context conditions, X-Y coordinates of electrostatic signals detected by a digitizer, stylus charging status, or other data and can be local to the computing device 500 or remote and communicatively connected to the computing device 500.

The computing device 500 includes a power supply 516, which is powered by one or more batteries or other power sources and which provides power to other components of the computing device 500. The power supply 516 may also be connected to an external power source that overrides or recharges the built-in batteries or other power sources.

The computing device 500 may include one or more communication transceivers 530, which may be connected to one or more antenna(s) 532 to provide network connectivity (e.g., mobile phone network, Wi-Fi®, Bluetooth®) to one or more other servers and/or client devices (e.g., mobile devices, desktop computers, or laptop computers). The computing device 500 may further include a communications interface 536 (e.g., a network adapter), which is a type of computing device. The computing device 500 may use the communications interface 536 and any other types of computing devices for establishing connections over a wide-area network (WAN) or local-area network (LAN). It should be appreciated that the network connections shown are examples and that other computing devices and means for establishing a communications link between the computing device 500 and other devices may be used.

The computing device 500 may include one or more input devices 534 such that a user may enter commands and information (e.g., a keyboard or mouse). These and other input devices may be coupled to the server by one or more interfaces 538, such as a serial port interface, parallel port, or universal serial bus (USB). The computing device 500 may further include a display 522, such as a touch screen display.

The computing device 500 may include a variety of tangible processor-readable storage media and intangible processor-readable communication signals. Tangible processor-readable storage can be embodied by any available media that can be accessed by the computing device 500 and includes both volatile and nonvolatile storage media, removable and non-removable storage media. Tangible processor-readable storage media excludes communications signals (e.g., signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 500. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Various software components described herein are executable by one or more processors, which may include logic machines configured to execute hardware or firmware instructions. For example, the processors may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Aspects of processors and storage may be integrated together into one or more hardware logic components. Such hardware-logic components may include field-programmable gate arrays (FPGAs), program- and application-specific integrated circuits (PASIC/ASICs), program-specific and application-specific standard products (PSSP/ASSPs), system-on-a-chip (SOC), and complex programmable logic devices (CPLDs), for example.

The terms "module," "program," and "engine" may be used to describe an aspect of a remote-control device and/or a physically controlled device implemented to perform a particular function. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service," as used herein, is an application program executable across one or multiple user sessions. A service may be available to one or more system components, programs, and/or other services. In some implementations, a service may run on one or more server computing devices.

While this specification contains many specific implementation details, these should not be construed as limitations on the scope of any technologies or of what may be claimed, but rather as descriptions of features specific to particular implementations of the particular described technology. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order or that all illustrated operations be performed to achieve desirable results. Furthermore, it should be understood that logical operations may be performed in any order, adding or omitting operations as desired, regardless of whether operations are labeled or identified as optional, unless explicitly claimed otherwise or a specific order is inherently necessitated by the claim language. In some cases, the actions recited in the claims can be performed in a different order and still achieve desirable results. In certain circumstances, multitasking and parallel processing may be advantageous. The logical operations making up implementations of the technology described herein may be referred to variously as operations, steps, objects, or modules.

Clause 1. A method of managing electrostatic communications between a digitizer of a computing device and an input device including multiple electrostatic antennas, the method comprising: detecting an indication of a data-linkable context for the input device; transitioning communication between the digitizer of the computing device and the input device from a user interface mode to a data link mode, based at least in part on the detecting; and communicating between the input device and the digitizer in the data link mode via the multiple electrostatic antennas of the input device, based at least in part on the transitioning.

Clause 2. The method of clause 1, wherein the detecting comprises: detecting, by the digitizer, that the multiple electrostatic antennas of the input device are operational.

Clause 3. The method of clause 1, wherein the detecting comprises: detecting, by the digitizer, that the multiple electrostatic antennas of the input device satisfy a predefined proximity condition relative to the digitizer.

Clause 4. The method of clause 1, further comprising: receiving input via a user interface of the computing device, prior to the detecting, the input triggering presentation of an instruction by the computing device corresponding to triggering the indication of the data-linkable context for the input device.

Clause 5. The method of clause 1, wherein the detecting comprises: detecting, by the digitizer, that the multiple electrostatic antennas of the input device satisfy a predefined location condition within bounds of the digitizer.

Clause 6. The method of clause 1, wherein the communicating comprises: communicating between the input device and the digitizer in the data link mode via the multiple electrostatic antennas of the input device, based at least on transitioning from the user interface mode to the data link mode triggered by the detecting of the data-linkable context for the input device.

Clause 7. The method of clause 1, wherein the detecting comprises: detecting that the input device is charging.

Clause 8. A system for managing electrostatic communications between a digitizer of a computing device and an electronic stylus including multiple electrostatic antennas, the system comprising: one or more hardware processors; a stylus context detector executable by the one or more hardware processors and configured to detect an indication of a data-linkable context for the electronic stylus; a mode modifier executable by the one or more hardware processors and configured to transition communication between the digitizer of the computing device and the electronic stylus from a user interface mode to a data link mode, based at least in part on the detecting; and an electrostatic communication interface executable by the one or more hardware processors and configured to communicate between the electronic stylus and the digitizer in the data link mode via the multiple electrostatic antennas of the electronic stylus, based at least in part on the transitioning the communication between the digitizer of the computing device and the electronic stylus from the user interface mode to the data link mode.

Clause 9. The system of clause 8, wherein the stylus context detector is further configured to detect, by the digitizer, that the multiple electrostatic antennas of the electronic stylus are operational.

Clause 10. The system of clause 8, wherein the stylus context detector is further configured to detect, by the digitizer, that the multiple electrostatic antennas of the electronic stylus satisfy a predefined proximity condition relative to the digitizer.

Clause 11. The system of clause 8, further comprising: a user interface of the computing device executable by the one or more hardware processors and configured to receive input via a user interface of the computing device, prior to the detecting, the input triggering presentation of an instruction by the computing device corresponding to triggering the indication of the data-linkable context for the electronic stylus.

Clause 12. The system of clause 8, wherein the stylus context detector is further configured to detect, by the digitizer, that the multiple electrostatic antennas of the electronic stylus satisfy a predefined location condition within bounds of the digitizer.

Clause 13. The system of clause 8, wherein the electrostatic communication interface is further configured to communicate between the electronic stylus and the digitizer in the data link mode via the multiple electrostatic antennas of the electronic stylus, based at least on transitioning from the user interface mode to the data link mode triggered by the detecting of the data-linkable context for the electronic stylus.

Clause 14. The system of clause 8, wherein the stylus context detector is further configured to detect that the electronic stylus is charging.

Clause 15. One or more tangible processor-readable storage media embodied with instructions for executing on one or more processors and circuits of a computing device a process for managing electrostatic communications between a digitizer of a computing device and an electronic stylus including multiple electrostatic antennas, the process comprising: detecting an indication of a data-linkable context for the electronic stylus using the multiple electrostatic antennas of the electronic stylus; transitioning communication between the digitizer of the computing device and the electronic stylus from a user interface mode to a data link mode, based at least in part on the detecting; and communicating between the electronic stylus and the digitizer in the data link mode via at least one of the multiple electrostatic antennas of the electronic stylus, based at least in part on the transitioning.

Clause 16. The one or more tangible processor-readable storage media of clause 15, wherein the detecting comprises: detecting, by the digitizer, that the multiple electrostatic antennas of the electronic stylus are operational.

Clause 17. The one or more tangible processor-readable storage media of clause 15, wherein the detecting comprises: detecting, by the digitizer, that the multiple electrostatic antennas of the electronic stylus satisfy a predefined proximity condition relative to the digitizer.

Clause 18. The one or more tangible processor-readable storage media of clause 15, further comprising: receiving input via a user interface of the computing device, prior to the detecting, the input triggering presentation of an instruction by the computing device corresponding triggering the indication of the data-linkable context for the electronic stylus.

Clause 19. The one or more tangible processor-readable storage media of clause 15, wherein the detecting comprises: detecting, by the digitizer, that the multiple electrostatic antennas of the electronic stylus satisfy a predefined location condition within bounds of the digitizer.

Clause 20. The one or more tangible processor-readable storage media of clause 15, wherein the communicating comprises: communicating between the electronic stylus and the digitizer in the data link mode via the multiple electrostatic antennas of the electronic stylus, based at least on transitioning from the user interface mode to the data link mode triggered by the detecting of the data-linkable context for the electronic stylus.

Clause 21. A system of managing electrostatic communications between a digitizer of a computing device and an electronic stylus including multiple electrostatic antennas, the system comprising: means for detecting an indication of a data-linkable context for the electronic stylus; means for transitioning communication between the digitizer of the computing device and the electronic stylus from a user interface mode to a data link mode, based at least in part on the detecting; and means for communicating between the electronic stylus and the digitizer in the data link mode via the multiple electrostatic antennas of the electronic stylus, based at least in part on the means for transitioning.

Clause 22. The system of clause 21, wherein the means for detecting comprises: means for detecting, by the digitizer, that the multiple electrostatic antennas of the electronic stylus are operational.

Clause 23. The system of clause 21, wherein the means for detecting comprises: means for detecting, by the digitizer, that the multiple electrostatic antennas of the electronic stylus satisfy a predefined proximity condition relative to the digitizer.

Clause 24. The method of clause 21, further comprising: means for receiving input via a user interface of the computing device, prior to the detecting, the input triggering presentation of an instruction by the computing device corresponding to triggering the indication of the data-linkable context for the electronic stylus.

Clause 25. The system of clause 21, wherein the means for detecting comprises: means for detecting, by the digitizer, that the multiple electrostatic antennas of the electronic stylus satisfy a predefined location condition within bounds of the digitizer.

Clause 26. The system of clause 21, wherein the means for communicating comprises: means for communicating between the electronic stylus and the digitizer in the data link mode via the multiple electrostatic antennas of the electronic stylus, based at least on transitioning from the user interface mode to the data link mode triggered by the detecting of the data-linkable context for the electronic stylus.

Clause 27. The system of clause 21, wherein the means for detecting comprises: means for detecting that the electronic stylus is charging.

Moreover, the separation of various system components in the implementations described above should not be understood as requiring such separation in all implementations, and it should be understood that the described program components and systems can generally be integrated together in a single software product or packaged into multiple software products. Thus, particular implementations of the subject matter have been described. Other implementations are within the scope of the following claims. Nevertheless, it will be understood that various modifications can be made without departing from the spirit and scope of the recited claims.

What is claimed is:

1. A method of managing electrostatic communications between a digitizer of a computing device and an input device including multiple electrostatic antennas, the method comprising:
    detecting an indication of a data-linkable context for the input device;
    transitioning communication between the digitizer of the computing device and the input device from a user interface mode to a data link mode, based at least in part on the detecting; and
    communicating between the input device and the digitizer in the data link mode via the multiple electrostatic antennas of the input device, based at least in part on the transitioning.

2. The method of claim 1, wherein the detecting comprises:
    detecting, by the digitizer, that the multiple electrostatic antennas of the input device are operational.

3. The method of claim 1, wherein the detecting comprises:
    detecting, by the digitizer, that the multiple electrostatic antennas of the input device satisfy a predefined proximity condition relative to the digitizer.

4. The method of claim 1, further comprising:
    receiving input via a user interface of the computing device, prior to the detecting, the input triggering presentation of an instruction by the computing device corresponding to triggering the indication of the data-linkable context for the input device.

5. The method of claim 1, wherein the detecting comprises:
    detecting, by the digitizer, that the multiple electrostatic antennas of the input device satisfy a predefined location condition within bounds of the digitizer.

6. The method of claim 1, wherein the communicating comprises:
    communicating between the input device and the digitizer in the data link mode via the multiple electrostatic antennas of the input device, based at least on transitioning from the user interface mode to the data link mode triggered by the detecting of the data-linkable context for the input device.

7. The method of claim 1, wherein the input device includes an electronic stylus.

8. The method of claim 1, wherein transitioning communication comprises:
    transitioning communication between the digitizer of the computing device and the multiple electrostatic antennas of the input device from the user interface mode to the data link mode.

9. The method of claim 1, wherein transitioning communication comprises:
    switching the multiple electrostatic antennas of the input device from the user interface mode to the data link mode.

10. A system for managing electrostatic communications between a digitizer of a computing device and an electronic stylus including multiple electrostatic antennas, the system comprising:
  one or more hardware processors;
  a stylus context detector executable by the one or more hardware processors and configured to detect an indication of a data-linkable context for the electronic stylus;
  a mode modifier executable by the one or more hardware processors and configured to transition communication between the digitizer of the computing device and the electronic stylus from a user interface mode to a data link mode, based at least in part on the detecting; and
  an electrostatic communication interface executable by the one or more hardware processors and configured to communicate between the electronic stylus and the digitizer in the data link mode via the multiple electrostatic antennas of the electronic stylus, based at least in part on the transitioning the communication between the digitizer of the computing device and the electronic stylus from the user interface mode to the data link mode.

11. The system of claim 10, wherein the stylus context detector is further configured to detect, by the digitizer, that the multiple electrostatic antennas of the electronic stylus are operational.

12. The system of claim 10, wherein the stylus context detector is further configured to detect, by the digitizer, that the multiple electrostatic antennas of the electronic stylus satisfy a predefined proximity condition relative to the digitizer.

13. The system of claim 10, further comprising:
  a user interface of the computing device executable by the one or more hardware processors and configured to receive input via a user interface of the computing device, prior to the detecting, the input triggering presentation of an instruction by the computing device corresponding to triggering the indication of the data-linkable context for the electronic stylus.

14. The system of claim 10, wherein the stylus context detector is further configured to detect, by the digitizer, that the multiple electrostatic antennas of the electronic stylus satisfy a predefined location condition within bounds of the digitizer.

15. The system of claim 10, wherein the electrostatic communication interface is further configured to communicate between the electronic stylus and the digitizer in the data link mode via the multiple electrostatic antennas of the electronic stylus, based at least on transitioning from the user interface mode to the data link mode triggered by the detecting of the data-linkable context for the electronic stylus.

16. The system of claim 10, wherein the stylus context detector is further configured to detect that the electronic stylus is charging.

17. One or more tangible processor-readable storage media embodied with instructions for executing on one or more processors and circuits of a computing device a process for managing electrostatic communications between a digitizer of a computing device and an electronic stylus including multiple electrostatic antennas, the process comprising:
  detecting an indication of a data-linkable context for the electronic stylus using the multiple electrostatic antennas of the electronic stylus;
  transitioning communication between the digitizer of the computing device and the electronic stylus from a user interface mode to a data link mode, based at least in part on the detecting; and
  communicating between the electronic stylus and the digitizer in the data link mode via at least one of the multiple electrostatic antennas of the electronic stylus, based at least in part on the transitioning.

18. The one or more tangible processor-readable storage media of claim 17, wherein the detecting comprises:
  detecting, by the digitizer, that the multiple electrostatic antennas of the electronic stylus are operational.

19. The one or more tangible processor-readable storage media of claim 17, wherein the detecting comprises:
  detecting, by the digitizer, that the multiple electrostatic antennas of the electronic stylus satisfy a predefined proximity condition relative to the digitizer.

20. The one or more tangible processor-readable storage media of claim 17, further comprising:
  receiving input via a user interface of the computing device, prior to the detecting, the input triggering presentation of an instruction by the computing device corresponding triggering the indication of the data-linkable context for the electronic stylus.

21. The one or more tangible processor-readable storage media of claim 17, wherein the detecting comprises:
  detecting, by the digitizer, that the multiple electrostatic antennas of the electronic stylus satisfy a predefined location condition within bounds of the digitizer.

22. The one or more tangible processor-readable storage media of claim 17, wherein the communicating comprises:
  communicating between the electronic stylus and the digitizer in the data link mode via the multiple electrostatic antennas of the electronic stylus, based at least on transitioning from the user interface mode to the data link mode triggered by the detecting of the data-linkable context for the electronic stylus.

* * * * *